June 6, 1950            G. KOSCHER            2,510,641
SPEAR
Filed May 17, 1946
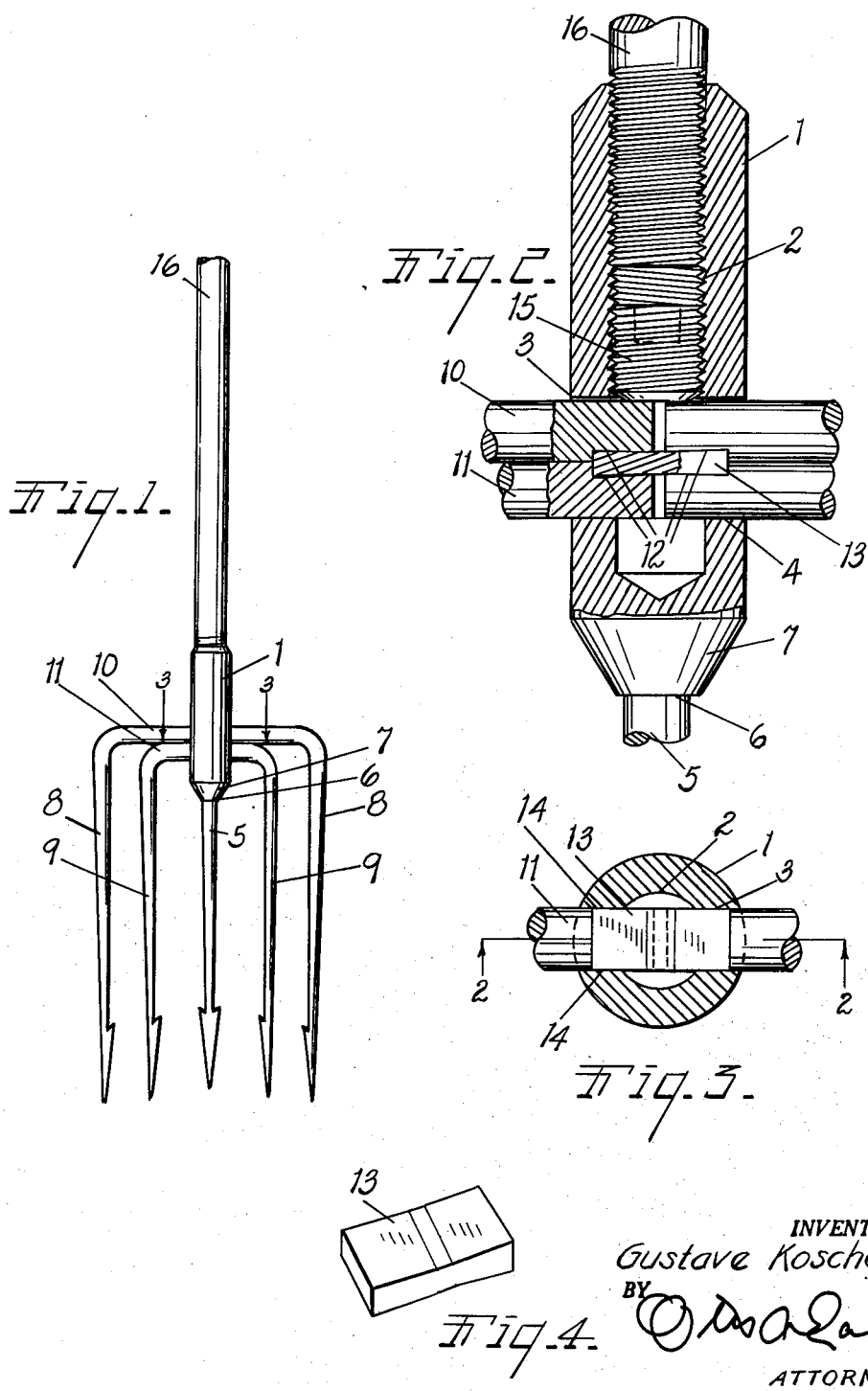
INVENTOR.
Gustave Koscher
ATTORNEY.

Patented June 6, 1950

2,510,641

UNITED STATES PATENT OFFICE 2,510,641

SPEAR

Gustave Koscher, Detroit, Mich.

Application May 17, 1946, Serial No. 670,447

5 Claims. (Cl. 294—61)

1

This invention relates to improvements in spears.

The main objects of this invention are:

First, to provide a spear adapted for spearing fish and the like in which the tines may be formed of high grade springable steel and at the same time are effectively mounted on the head.

Second, to provide a structure in which the tines may be economically formed of rod stock and easily and quickly assembled.

Third, to provide a balanced spear having a plurality of tines.

Objects relating to details and economies of the invention will appear from the description to follow. The invention is defined and pointed out in the claims.

A preferred embodiment of the invention is illustrated in the accompanying drawing, in which:

Fig. 1 is an elevational view of a spear embodying the invention, the handle being partially broken away.

Fig. 2 is an enlarged fragmentary view partially in section on line 2—2 of Fig. 3.

Fig. 3 is an enlarged fragmentary view partially in transverse section on line 3—3 of Fig. 1.

Fig. 4 is an enlarged perspective view of the tine key member.

In the embodiment of the invention illustrated the head member 1 is cylindrical and is provided with a longitudinal bore 2 extending from its inner end and with a transverse slot 3 opening to the bore. The ends of the slot are rounded or curved, the lower end of the slot forming seats 4.

The central tine 5 is outwardly tapered and double barbed and is formed integrally with the head member or centrally secured to the inner end thereof at 6. The inner end of the head member is preferably conical as shown at 7.

The outer and intermediate tines 8 and 9 are provided with laterally turned shanks 10 and 11 respectively, the shanks of the pairs of outer and intermediate tines being arranged in superimposed relation within the slot of the head member.

The shanks have opposed key receiving recesses 12 at their inner ends, these recesses being notch-like in the embodiment illustrated and the sides of the recesses are inwardly inclined. The shanks are arranged within the slot with the key member 13 between them, this key member being inwardly tapered from each end—that is, its sides are complemental to the sides of the recesses so that when the shanks are clamped together upon the key member a wedging action results and the tines are effectively secured within the slot of the head member.

The side walls 14 of the slot laterally support the tine shanks—that is, the shanks are supported against rolling and tilting movement by the side walls of the slot.

The bore 2 of the head member is internally threaded to receive the clamping screw 15 which is threaded into clamping engagement with the shanks 10 thereby clamping the shanks and key member together and clamping the shanks within the slot of the head. The screw is desirably of the Allen set screw type.

The handle 16 which is desirably of steel is threaded into the bore of the head above the set or clamping screw and preferably serves as a locking member to prevent loosening of the clamping screw although that is unlikely to occur.

I have illustrated and described my invention as embodied in a commercial form as embodied in a fish spear. I have not attempted to illustrate other embodiments or adaptations as I believe this disclosure will enable those skilled in the art to embody or adapt my invention as may be desired.

Having thus described my invention, what I claim as new and desire to secure by Letters Patent is:

1. In a spear, the combination of a head member having a bore extending from its outer end and a transverse slot therethrough opening to the bore, the ends of the slot being rounded, a central tine extending from the inner end of said head, outer and intermediate tines having angularly disposed inwardly projecting shanks engaged in said slot in said head with corresponding shanks in superimposed relation, the inner end of the slot constituting seats for the shanks of the intermediate tines, the side walls of the slot laterally supporting the shanks, the shanks having opposed notch-like side recesses at their inner ends, the sides of the recesses being inwardly inclined, a key member disposed between said shanks within said recesses, said key member being inwardly tapered from each end to complement the inclined sides of the recesses, the bore of said head above said slot being internally threaded, and a set screw threaded into said bore to engage the shanks of the outer tines and clamp the tine shanks within said slot and upon said key member, the bore of said head member above said set screw being adapted to receive a handle.

2. In a spear, the combination of a head member having a bore extending from its outer end and a transverse slot therethrough opening to the bore, a central tine extending from the inner end of said head, outer and intermediate tines having angularly disposed inwardly projecting shanks engaged in said slot in said head with corresponding shanks in superimposed relation, the shanks having opposed notch-like side recesses at their inner ends, the sides of the recesses being inwardly inclined, a key member disposed between said shanks within said recesses, said key member being inwardly tapered from each end to complement the inclined sides of the recesses, and a set screw threaded into said bore to engage the shanks of the outer tines and clamp the tine shanks within said slot and upon said key member.

3. In a spear, the combination of a head member having a bore extending from its outer end and a transverse slot opening to the bore, outer and inner tines having laterally extending shanks engaged in said slot in said head with the shanks of the outer tines in superimposed relation to the shanks of the inner tines, the inner end of the slot constituting seats for the shanks of the inner tines, the sides of the slot laterally supporting the shanks, the shanks having opposed key receiving recesses at their inner ends, a key member common to the shanks disposed between the superimposed shanks within said recesses in wedging engagement therewith, and a screw threaded into said bore to engage the shanks of the outer tines and clamp the shanks and key member within said slot, the bore of said head member above said screw being adapted to receive a handle.

4. In a spear, the combination of a head member having a bore extending from its outer end and a transverse slot opening to the bore, outer and inner tines having laterally extending shanks engaged in said slot in said head with the shanks of the outer tines in superimposed relation to the shanks of the inner tines, the shanks having opposed key receiving recesses at their inner ends, a key member common to the shanks disposed between the superimposed shanks within said recesses in wedging engagement therewith, and a screw threaded into said bore to engage the shanks of the outer tines and clamp the shanks and key member within said slot.

5. In a spear, the combination of a head member having a bore extending from its outer end and a transverse slot opening through opposite sides of said head to the bore, pairs of tines having inwardly projecting shanks engaged in said slot in said head in opposed relation with the shanks of each pair of tines in superimposed relation and with the sides of the slot laterally supporting the shanks, the shanks of each pair having opposed recesses at their inner ends cooperating to form transversely wedge shaped pockets with the pockets between each pair of shanks opening transversely to each other at their narrow ends and adapted to receive a double wedge shaped key member, a key member disposed between said shanks in engagement with their said recesses, and a screw threaded into said bore to clamp the tine shanks upon said key member said key member being longer than the diameter of said bore whereby the sides of said key engage and are retained by the edges of said slot.

GUSTAVE KOSCHER.

REFERENCES CITED

The following references are of record in the file of this patent:

UNITED STATES PATENTS

| Number | Name | Date |
|---|---|---|
| 65,277 | Riley | May 28, 1867 |
| 85,465 | McKinney | Dec. 29, 1868 |
| 1,398,342 | Pleaue | Nov. 29, 1921 |